(No Model.)  2 Sheets—Sheet 1.
F. H. RICHARDS.
FRICTION CLUTCH.
No. 283,145.  Patented Aug. 14, 1883.
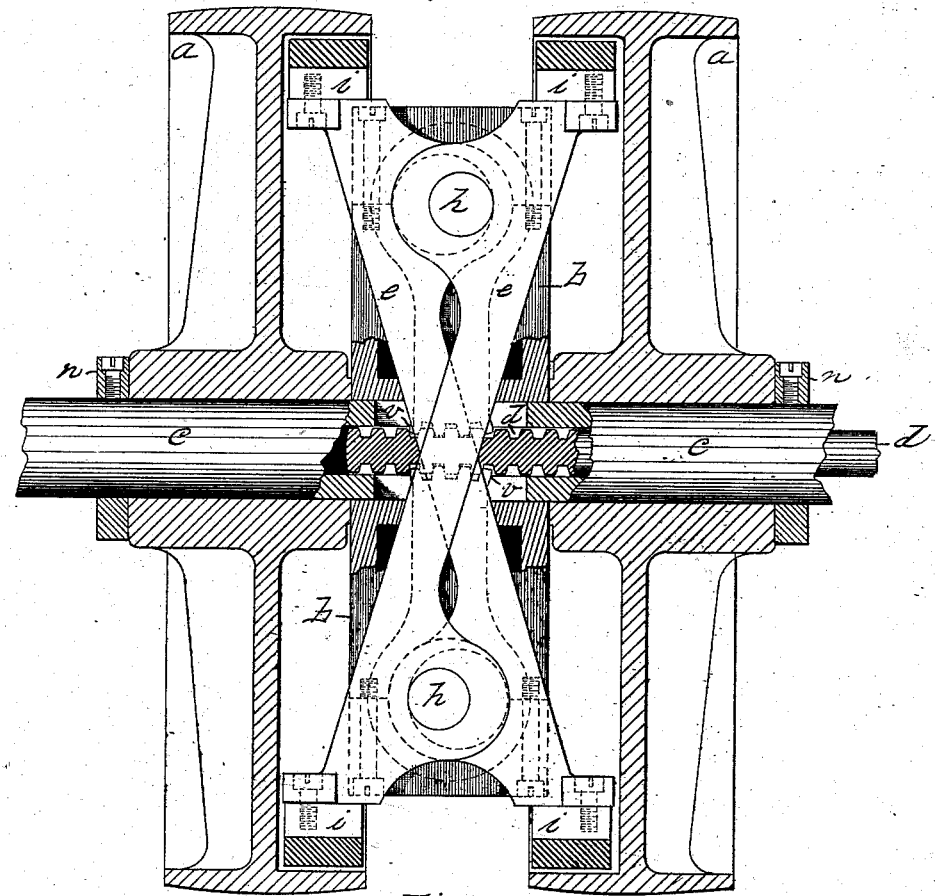
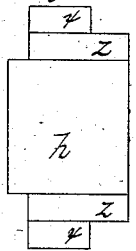

(No Model.)  2 Sheets—Sheet 2.
F. H. RICHARDS.
FRICTION CLUTCH.
No. 283,145. Patented Aug. 14, 1883.
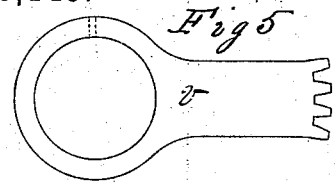
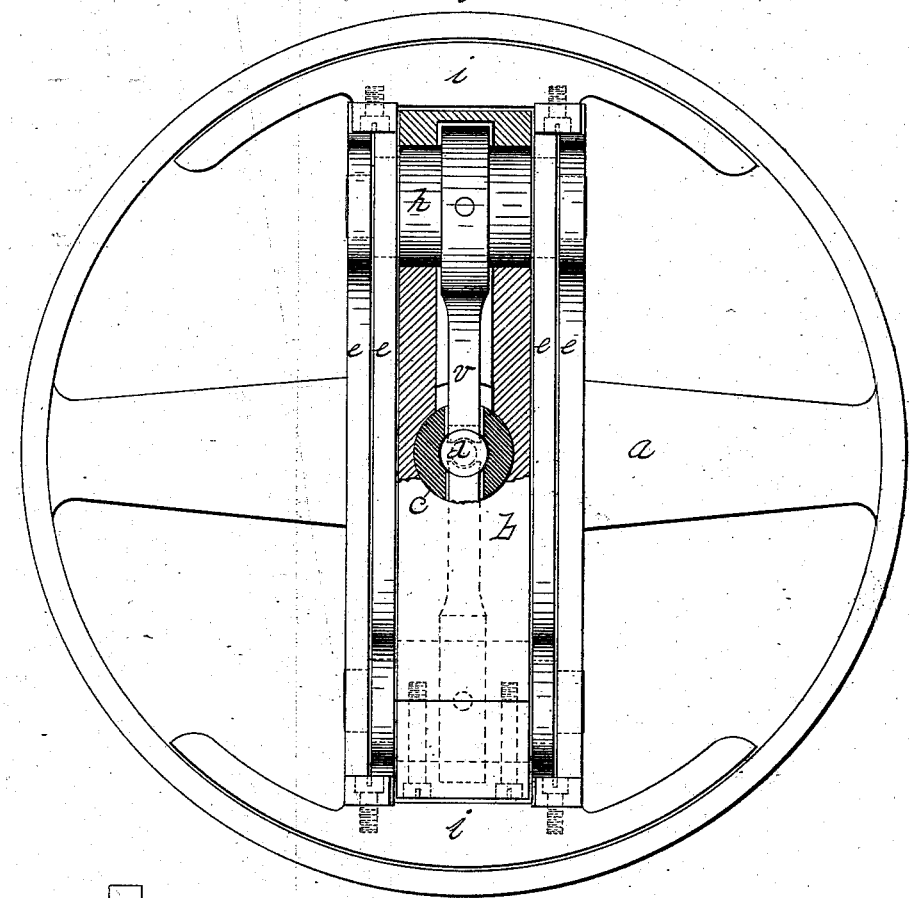
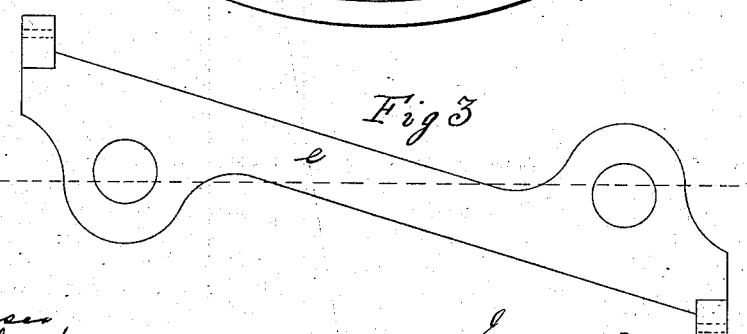
Witnesses
U. O. Chapin
R. F. Hyde
Inventor
Francis H. Richards
By Henry A. Chapin
Atty

UNITED STATES PATENT OFFICE.

FRANCIS H. RICHARDS, OF SPRINGFIELD, MASSACHUSETTS.

FRICTION-CLUTCH.

SPECIFICATION forming part of Letters Patent No. 283,145, dated August 14, 1883.

Application filed January 30, 1883. (No model.)

*To all whom it may concern:*

Be it known that I, FRANCIS H. RICHARDS, a citizen of the United States, residing at Springfield, in the county of Hampden and State of Massachusetts, have invented new and useful Improvements in Friction-Clutches, of which the following is a specification.

This invention relates to improvements in friction-clutches and their operating mechanism, the object being to provide a clutch of this class which is operative through a very slight motion of the moving friction-surfaces, and between two closely-set pulleys or in a single pulley, by means of devices operating from the interior of the shaft upon which said pulley or pulleys are adapted to revolve, said improved clutch being particularly adapted for use in machines which require sensitively-operating mechanism for stopping and starting and for reversing the motion thereof.

In the drawings forming part of this specification, Figure 1 is a view, partly in section, of two pulleys and their supporting-shaft, having combined therewith friction-clutch mechanism constructed according to my invention. Fig. 2 is a side elevation of one of the pulleys shown in Fig. 1 and of the friction-clutch, partly in section. Figs. 3, 4, and 5 are detail views.

In the drawings, $a\ a$ indicate two pulleys. $c$ is a hollow shaft. $n\ n$ are collars on said shaft. $d$ is a toothed rod fitting into shaft $c$. $b$ is a block, of rectangular form, secured firmly to shaft $c$ between pulleys $a$. $h\ h$ are two eccentric shafts having bearings in block $b$. $v\ v$ are toothed levers. $e\ e$ indicate connecting-bars. $i\ i$ are friction-shoes.

Like letters indicate like parts in the several figures.

The shaft $c$ is provided with a central cylindrical chamber for the reception of the toothed rod $d$, and has two slots cut through its sides, opposite each other and opening into said cylindrical chamber. Said rod $d$ is provided with a series of rack-teeth over a portion of its length, and is fitted to enter said shaft $c$, so as to bring said rack-teeth opposite the aforesaid slots therein, and to have a longitudinally-sliding motion within said shaft by means of any suitable shipper-lever connection therewith.

The block $b$ is firmly keyed or otherwise secured to the shaft $c$, and is constructed as follows to adapt it to support the several clutch-actuating devices hereinafter described: Block $b$ is, as above mentioned, of rectangular form, its width—that is to say, across it, between the pulleys $a\ a$, Fig. 1—being rather more than its thickness, and it is pierced from edge to edge centrally to permit of placing it on shaft $c$, and it is there secured in any convenient manner to rotate with the latter. Said block is chambered out from its ends to said shaft-passage, the chamber on each side of the latter terminating directly over the aforesaid grooves through the sides of shaft $c$. Cylindrical bearings are formed at or near the ends of block $b$ in a line across shaft $c$ for the reception of two short eccentric shafts, $h$, Fig. 4, the usual caps being secured over the latter by screws entering the ends of said block, as shown.

The following devices, constituting, with the friction-shoes $i$, the operative parts of the friction-clutch, apart from the sliding rod $d$ within shaft $c$, are connected to said block $b$. A flat toothed lever, $v$, is placed within each end of said block, the teeth thereon, by reason of the arm of said lever passing through said slots in shaft $c$, being brought into engagement with the rack-teeth on said rod $d$. The said eccentric shafts $h$ are placed in their said bearings in block $b$, and are passed through the perforations in each lever, and the latter are firmly secured to shaft $h$ by a pin or screw, as shown. Said shafts $h$ are identical in form, and each one has two eccentrics formed on each end thereof, (indicated in Fig. 4 by the letters $x\ z$.) Four connecting-bars, $e$, Fig. 3, are hung upon block $b$, two on opposite sides thereof, in a crossed position, as in Fig. 1, upon the said eccentrics $x$ and $z$ thereon, the bar which lies next to said block being hung upon the eccentric $z$, and the outer bars upon the smaller one, $x$. These forms of eccentrics are employed for convenience in assembling said bars one above the other. Before said bars $e$ are placed on said eccentrics the latter are set to the positions shown in Fig. 1, or so that their centers stand relatively as indicated by the dotted line in Fig. 3. The two friction-shoes $i$, which operate against the inner face of each pulley, are bolted to the ends of the bars e, as shown in Figs. 1 and 2— that is to say, taking the right-hand pulley in Fig. 1 as an illustration. The upper shoe is bolted to the ends of the two outside bars, e, while the lower shoe in said pulley is bolted to the lower ends of the bars e, which lie next to block b. In the left-hand pulley in Fig. 1 said shoes are secured to the bars e in the reverse position from that just described.

The operation of this invention is as follows: The pulleys a a are adapted to turn freely on shaft c in reverse direction through belts running thereon, as usual, between block b and the collars n n, secured to said shaft. The position of the shoes i in Fig. 1—that is, removed from contact with said pulleys—leaves the latter free to revolve without turning shaft c. If, now, it be desired to set said shaft in motion, by operating the clutch devices to engage with the left-hand pulley, Fig. 1, the rod d is moved to the left in shaft c, and carries with it the toothed ends of both levers v. The latter in turn rock the shafts h h, so operating the eccentric z thereon, upon which the bars e next to block b are hung, as to move said bars and the upper shoe, i, so that the latter is forced against the inner face of the rim of said pulley, and simultaneously with said upward movement of said bars and shoe. The two bars which are located outside of the others are, by the reverse action of the eccentrics x x, together with the shoe i, which is secured to their lower ends, moved downward, so that both shoes have a simultaneous movement away from each other, and both, although attached to separate bars or pairs thereof, engage at the same instant with said pulley. Thus, at the instant of contact of said shoes and pulley, block b and its above-described connecting mechanism, together with shaft c and rod d, are rotated by the pulley with which said friction-shoes are brought in contact.

The above-described movement of bars e, to engage the shoes i with the pulley at the left, causes the shoes contiguous to the rim of the pulley at the right to move away from said rim, and vice versa, and a proper movement of rod d draws all of the shoes away from the pulley-rims and stops the rotation of shaft c.

It will be seen that the movement of rod d, even with a lever of low power, results in a forcible movement of the shoes i against the pulley, and that since said movement is in substantially a direct line from the shaft c, and the construction of the operating parts is such as to secure the utmost rigidity, the movement of said shoes may be made so little as to require such a slight motion in rod d to engage or disengage them that this clutch device constitutes one of extreme sensitiveness to any movement of a shipper-lever, and provides means for instantly stopping and starting machinery by friction-clutch devices not heretofore enjoyed.

It will be seen that the devices above devices may with equal advantage be applied to a single driving-pulley.

What I claim as my invention is—

1. The combination, with a hollow shaft having slots through its sides, and a rod adapted to slide in said shaft, and by one or more pulleys revolving freely on the latter, and suitable friction-shoes to engage therewith, of mechanism, substantially as described, interposed between said sliding rod and said shoes, whereby the longitudinal movement of said rod causes said friction-shoes to be moved in a direction substantially at right angles thereto, all as set forth.

2. The combination, with one or more freely-running pulleys and friction-shoes, substantially as described, of a hollow shaft having slots through its sides, a rod having rack-teeth thereon to slide in said shaft, a hollow rectangular block secured on said shaft, and provided with two rock-shafts having eccentrics on each end thereof, two levers secured to said rock-shafts within said block, and adapted to engage with said sliding rod, four connecting-bars located two on opposite sides of said hollow block, and connected with the eccentrics on said rock-shafts, and with said friction-shoes, substantially as set forth.

3. In combination, the hollow block b, the hollow shaft c, the rod d, the levers v, adapted to engage with said rod, the eccentric rock-shafts h, and the four connecting-bars e, substantially as set forth.

FRANCIS H. RICHARDS.

Witnesses:
WM. H. CHAPIN,
B. F. HYDE.